US010586250B1

(12) United States Patent
Spils et al.

(10) Patent No.: US 10,586,250 B1
(45) Date of Patent: Mar. 10, 2020

(54) INCENTIVIZED CROWD-SOURCE PRICING

(71) Applicant: Amazon Technologies, Inc., Reno, NV (US)

(72) Inventors: Gregory R. Spils, Bainbridge Island, WA (US); Paul Springer, Seattle, WA (US); Brian Jeffrey Saltzman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1072 days.

(21) Appl. No.: 13/917,557

(22) Filed: Jun. 13, 2013

Related U.S. Application Data

(63) Continuation of application No. 13/300,346, filed on Nov. 18, 2011.

(51) Int. Cl.
*G06Q 30/00* (2012.01)
*G06Q 30/02* (2012.01)

(52) U.S. Cl.
CPC .................. *G06Q 30/0259* (2013.01)

(58) Field of Classification Search
CPC ....................... G06Q 30/00–30/0284
USPC ............................... 705/14.1–14.73
See application file for complete search history.

(56) References Cited

U.S. PATENT DOCUMENTS

| | | | |
|---|---|---|---|
| 2006/0294151 A1 | 12/2006 | Wong et al. | |
| 2008/0262928 A1* | 10/2008 | Michaelis | G06Q 30/02 705/14.26 |
| 2009/0113532 A1* | 4/2009 | Lapidous | G06F 21/10 726/7 |
| 2010/0299212 A1 | 11/2010 | Graylin et al. | |
| 2010/0318412 A1* | 12/2010 | Karypis | G06Q 30/02 705/14.1 |
| 2011/0223895 A1* | 9/2011 | Wagda | H04W 4/23 455/414.2 |
| 2011/0295722 A1* | 12/2011 | Reisman | G06Q 30/0201 705/27.1 |
| 2012/0066039 A1 | 3/2012 | Ang | |
| 2012/0123924 A1* | 5/2012 | Rose | G06O 20/12 705/35 |
| 2012/0233238 A1 | 9/2012 | Braginsky et al. | |
| 2013/0066944 A1 | 3/2013 | Laredo et al. | |

OTHER PUBLICATIONS

Office action for U.S. Appl. No. 13/300,346 dated Oct. 8, 2015, Spils et al., "Incentivized Crowd-Sourced Pricing", 23 pages.

(Continued)

*Primary Examiner* — John Van Bramer
(74) *Attorney, Agent, or Firm* — Lee & Hayes, P.C.

(57) ABSTRACT

A host may provide a crowd-source price program. Participants in the crowd-source price program are incentivized to participate by rewards offered by the host. A participant acquires commercial information related to goods, services, or both being offered by a merchant and provides the host with the commercial information. The commercial information may include a purchase price for goods, services, or both being offered by the merchant and may include an identifier corresponding to the goods, the services, or both. The host may validate the commercial information, generate a reward, and provide the reward to the participant. The reward may be an offer for goods, services, or both offered by the host. The participant may accept the reward.

20 Claims, 7 Drawing Sheets

(56) References Cited

OTHER PUBLICATIONS

Office Action for U.S. Appl. No. 13/300,346, dated Mar. 26, 2015, Gregory R. Spils, "Incentivized Crowd-Sourced Pricing", 19 pages.
Office action for U.S. Appl. No. 13/300,346, dated Jun. 15, 2016, Spils et al., "Incentivized Crowd-Sourced Pricing", 33 pages.
Office action for U.S. Appl. No. 13/300,346, dated Dec. 15, 2016, Spils et al., "Incentivized Crowd-Sourced Pricing", 29 pages.
Office Action for US Patent Application, dated Aug. 15, 2017, Spils, "Incentivized Crowd-Sourced Pricing", 49 pages.
Office Action for U.S. Appl. No. 13/300,346, dated Feb. 21, 2018, Spils, "Incentivized Crowd-Sourced Pricing", 88 pages.

* cited by examiner

INCENTIVIZED CROWD-SOURCE PRICING

PRIORITY APPLICATION

This application is a continuation of and claims priority from U.S. patent application Ser. No. 13/300,346, titled "Incentivized Crowd-Sourced Pricing", filed on Nov. 18, 2011, which is herein incorporated by reference.

BACKGROUND

In a competitive market, merchants often go to great lengths to attract and retain customers to help maintain and expand business. Traditionally, merchants have monitored prices for items (including goods, services, or both) offered by their competitors so as to, among other things, offer their own items at a competitive price.

Frequently, a merchant may people, which may be agents (e.g., price verification agents) of the merchant, check the prices of its competitors. These agents may visit a competitor's store and record prices for items being offered by the competitor. The merchant may then use this information of the competitor's prices for items in setting its own prices of the same, or comparable, items. However, employing agents to check prices of competitors is labor intensive, and hence expensive, and time consuming.

Some merchants check advertisements, by their competitors, for items being offered by their competitors to monitor their competitor's pricing. However, the advertisements normally reflect "sale" prices, and consequently, prices for advertised items may not reflect normal prices for the goods, the services or both when the goods, the services or both are not being advertised. In addition, monitoring competitor's advertisements is labor intensive, and hence expensive, and time consuming.

Some merchants check their competitor's websites for commercial information such as items being offered by their competitors and corresponding prices. However, there may be discrepancies between items being offered at a competitor's brick and mortar store and a website of the competitor. Similarly, there may be discrepancies between prices for the same items being offered by the competitor at the competitor's brick and mortar store and website. Further, if the competitor has multiple brick and mortar stores, there may be regional discrepancies in prices and/or in goods, service, or both between the multiple brick and mortar store and/or the competitor' website.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
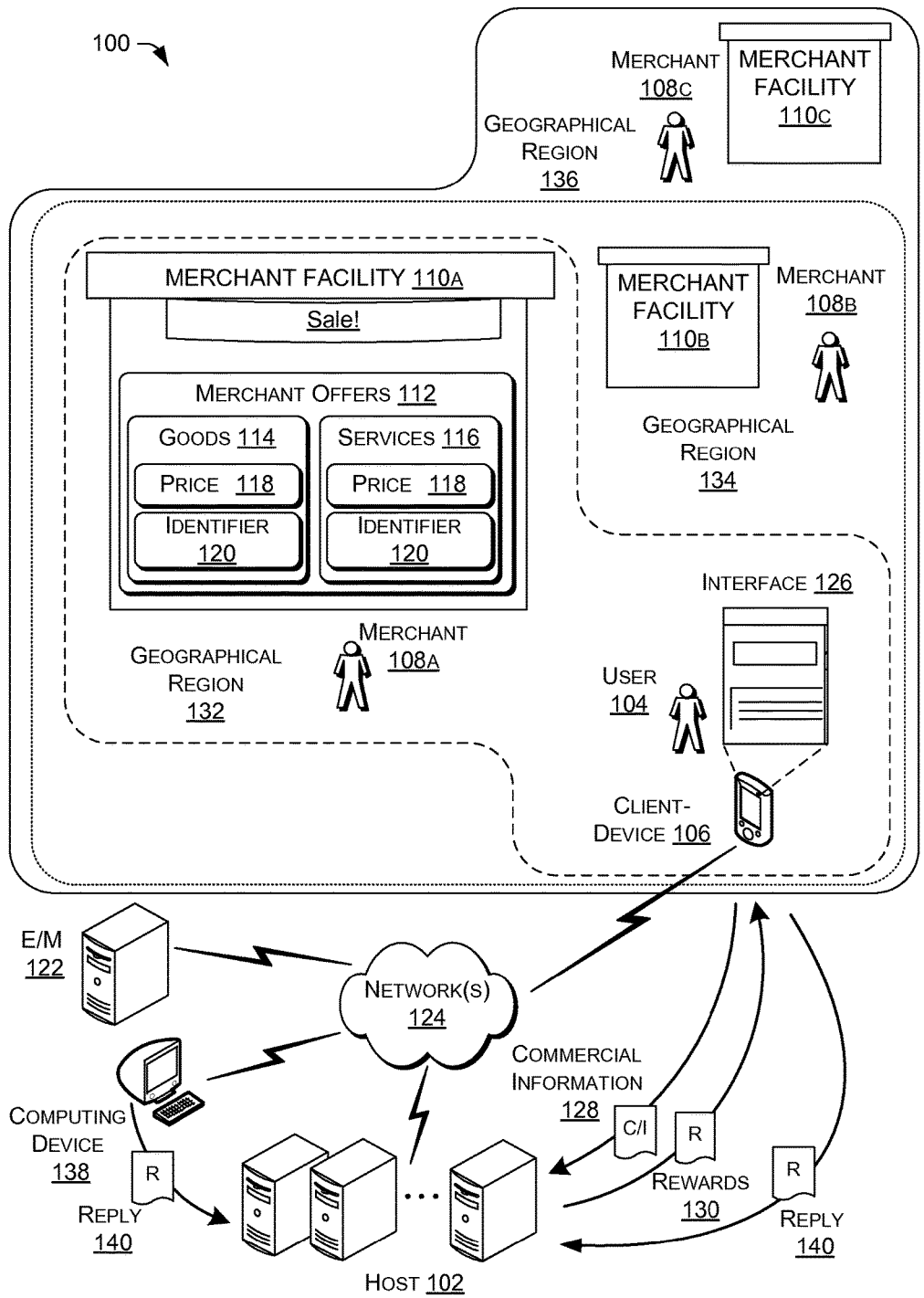
FIG. 1 is a schematic diagram of an illustrative computing environment to provide a crowd-sourced price program.

A host may provide a crowd-sourced price program that incentivizes customers to provide the host with commercial information of a competitor of the host. In some instances, the host may be an on-line or web-based merchant. The commercial information typically includes a purchase price for items, e.g., goods, services, or both, being offered by the competitor and may include a corresponding identifier for the goods, the services, or both.

The host can offer various rewards to participants in the crowd-sourced price program. A reward may include, but is not limited to: an offer to sell goods, services, or both; updates regarding commercial information of goods, services, or both (e.g., current prices for an item); points, such as points that may be redeemable toward a purchase, discount, etc. and that may be transferable; price comparison information (e.g., prices of goods, services, or both provided by one or more merchants); availability information (e.g., information indicating whether or not a good is available from a merchant or at a merchant facility and/or information indicating a quantity of goods available from a merchant or at a merchant facility); merchant location information (e.g., information that indicates a location of a merchant facility such as an address and/or a map that shows a geographical location of a merchant facility); and/or a reminder (e.g., the host reminds the participant of an upcoming event/date). For example, after a participant in the crowd-source program provides, to the host, a purchase price for goods, services, or both being offered by a competitor and the corresponding identifier for the goods, the services, or both, the host may reward the participant with an offer to sell goods, services, or both to the participant at a discount and/or with a reward. For example, the offer from the host may include terms that are more favorable to the participant such as, but not limited to, a lower purchase price, a warranty and/or extended warranty, financing, redeemable bonus points, free or reduced shipping, schedulable delivery, training, servicing, etc. In some instances, the offer from the host may be a time-limited offer having an expiration time.

In some instances, the goods, the services, or both offered by the host may be the same as the goods, the services, or both provided by the competitor. In some instances, the goods, the services, or both offered by the host may be comparable to the goods, the services, or both provided by the competitor. For example, specifications for goods offered by the host may be comparable to specifications for goods provided by the competitor (e.g., televisions of approximately the same size and same resolution).

In some instances, the goods, the services, or both offered by the host may include the same, or comparable, goods, services, or both provided by the competitor and additional goods, services, or both. For example, the competitor may offer to provide a home entertainment system and the offer from the host may include the same, or comparable, home entertainment system and bundled goods, services, or both, such as, but not limited to, associated cables, extended warranties, services of content providers, etc.

In some instances, the crowd-sourced price program may request the participant to at a brick and mortar merchant facility of the merchant when acquiring the purchase price for the goods, the services, or both and/or the corresponding identifying information. In other instances, the crowd-sourced price program may request the participant to provide the host with the purchase price for the goods, the services, or both and/or the corresponding identifying information contemporaneous to the participant being at the brick and mortar merchant facility of the merchant. However in other instances, the crowd-sourced price program may require the participant to provide the host with the purchase price for the goods, the services, or both and/or the corresponding identifying information while the participant is within the brick and mortar merchant facility of the merchant and/or within a predetermined geographical region of the merchant facility and/or within a predetermined distance of the merchant facility.

As another non-limiting example, after a participant in the crowd-source program provides, to the host, a purchase price for goods, services, or both being offered by a competitor and the corresponding identifier for the goods, the services, or both, the host may provide the participant with program participation points. In some instances, the participant may aggregate program participation points. In some instances, the participant may share program participation points with other participants of the crowd-source program.

As yet another non-limiting example, the host may incentivize program participants with trial offers. For example, after a participant in the crowd-source program provides, to the host, a purchase price for goods, services, or both being offered by a competitor and the corresponding identifier for the goods, the services, or both, the host may provide the participant with a trial offer for the same, or comparable, goods, services, or both. Terms of the trial offer may include use of the goods, the services, or both, for a fixed period of time, at no cost and/or a reduced cost, free or reduced return and/or cancellation fees, etc.

As yet another non-limiting example, the host may incentivize program participants with services. For example, many merchants have guaranteed-lowest-price programs for their goods, services, or both, i.e., if a customer purchases goods, services, or both from the merchant and afterwards finds the same goods, services, or both being offered at a lower price, the merchant will refund the difference of the purchase price and the lower price to the customer. The host may incentivize program participants by providing the program participants with pricing information for goods, services, or both so that the program participants may seek refunds under a merchant's guaranteed-lowest-price programs.

As yet another non-limiting example, after a program participant provides the host with a purchase price for goods, services, or both being offered by a first merchant and the corresponding identifier for the goods, the services, or both, the host may provide the participant with commercial information for a second merchant. The commercial information for the second merchant may include a purported price at which the second merchant is offering to sell the same, or comparable, goods, services, or both being provided by the first merchant. The commercial information for the second merchant may include geographical information indicative of a geographical location of a bricks and mortar merchant facility of the second merchant. The commercial information for the second merchant may include information indicative of a website of the second merchant.

In some embodiments, the host can offer various rewards to participants in the crowd-sourced price program without the participant providing a purchase price for goods, services, or both being provided by a merchant and/or without the participant providing an identifier corresponding to goods, services, or both being provided by a merchant. In some instances, the host may provide the participant with a reward based on a location of the participant. For example, the host may determine that the participant is at and/or proximal to a merchant facility of a merchant, determine goods, services, or both being offered by the merchant, and provide a reward to the participant. As another non-limiting example, in some instances, the host may provide the participant with a reward based on a time and/or date. For example, the host may reward the participant by reminding the participant that a particular day/date (e.g., a birthday, anniversary, holiday, religious celebration, etc.) is approaching. In some instances, the reminder might comprise the entirety of the reward, and in other instances, the reminder might comprise only a portion of the reward (e.g., the reward may further include: an offer for goods, services, or both; merchant location information; updates regarding commercial information of goods, services, or both; etc.).

As yet another example in which the host can offer various rewards to participants in the crowd-sourced price program without the participant providing a purchase price for goods, services, or both being provided by a merchant and/or without the participant providing an identifier corresponding to goods, services, or both being provided by a merchant, the host may provide the participant with a reward based on a social network of the participant. For example, in some instances, the crowd-sourced price program may include a reward structure in which a given participant is rewarded based at least in part on other participants that are in the same social network as the given participant (e.g., the number of other participants in the same social network as the given participant, the quantity of commercial information provided by the other participants in the same social network as the given participant, the quality of commercial information provided by the other participants in the same social network as the given participant, etc.).

The techniques and systems described herein may be implemented in a number of ways. Example implementations are provided below with reference to the following figures.

Illustrative Environment

FIG. 1 is a schematic diagram of an illustrative computing environment 100 to provide a crowd-sourced price program. The environment 100 includes a host 102 that incentivizes crowd-source pricing, a user 104 having a client-device 106, and merchants, collectively referenced to as merchants 108 and individually referenced as merchants 108A, 108B, or 108C, each of the merchants 108 having a corresponding brick and mortar merchant facility, collectively referenced as merchant facilities 110 and individually referenced as merchant facilities 110A, 110B, or 110C. The merchants 108 provide merchant offers 112 for goods 114, services 116, or both. The goods 114 and the services 116 have a purchase price 118 and a corresponding identifier 120. The identifier 120 may be a universal product code (UPC) and/or international article number (EAN) and/or other unique identifier. In addition, the merchants 108 may have a corresponding electronic marketplace (E/M) 122 for providing items such as goods, services, or both.

The user 104 may communicate with the host 102 via one or more network(s) 124 using the client-device 106. The client-device 106 may be a mobile telephone, a smart phone, a tablet computer, a laptop computer, a netbook, a personal digital assistance (PDA), a gaming device, a media player, or any other computing device that includes connectivity to the network(s) 124. The network(s) 124 may include wired and/or wireless networks that enable communications between the various entities in the environment 100. In some embodiments, the network(s) 124 may include local area networks (LANs), wide area networks (WAN), mobile telephone networks (MTNs), and other types of networks, possibly used in conjunction with one another, to facilitate communication between the host 102 and the user 104.

The client-device 106 may include a geo-locator device such as a global positioning system (GPS) device and may further include a data collection device. Non-limiting examples of data collection devices include image capture devices such as digital cameras, optical readers/scanners such as barcode readers/scanners, and wireless readers such as radio frequency identification (RFID) readers. The client-device 106 may also include a voice-recognition module that converts utterances into text. The client-device 106 may also include a user interface 126.

The user 104 is a participant of the crowd-sourced price program provided by the host 102. The user 104 acquires commercial information such as the purchase price 118 and identifier 120 for the goods 114, the services 116, or both. The user 104 may use the client-device 106 to acquire the commercial information by capturing an image, scanning, and/or reading the purchase price 118 and the identifier 120 for the goods 114, the services 116, or both. In some instances, the user 104 may use the client-device 106 to capture an image or images that includes a merchant identifier. In some instances, the user 104 may input, via the user interface 126, the purchase price 118 and the identifier 120 for the goods 114, the services 116, or both and/or other information such as, but not limited to, merchant facility geographical location information, merchant identity information, temporal information indicative of a time contemporaneous to when the purchase price 118 and identifier 120 for the goods 114, the services 116, or both were acquired, user identifier information indicative of an identity of the user 104, and/or goods, services, or both availability (e.g., an indicator of the quantity of in-stock items). The client-device 106 provides the host 102, via networks 124, with commercial information (C/I) 128.

The host 102 can offer participants in the crowd-sourced price program with various incentivizes that may include offers for goods, services, or both provided by the host 102. The host 102 provides the incentives to the program participants via rewards 130.

In some instances, to initiate a reward, the user 104 provides, via the client-device 106, the host 102 with the commercial information 128. However, in some instances, the user 104 may receive a reward from the host 102 without having provided, contemporaneously, the commercial information 128. The commercial information 128 may include, among other things, information indicative of the purchase price 118 and identifier 120 for the goods 114, the services 116, or both, information indicative of a user identifier, client geographical location information indicative of a current geographical location of the client-device 106, and a timestamp indicative of a time contemporaneous to when the purchase price 118 and identifier 120 for the goods 114, the services 116, or both were acquired, and/or information indicative of a time contemporaneous to when the client-device 106 transmitted the commercial information 128. In some instances, the commercial information 128 may include merchant facility geographical location information indicative of a geographical location of the merchant facility 110A and/or may include merchant identity information indicative of an identity of the merchant 108B. In addition, the commercial information 128 may include a user identifier.

The host 102 may verify the commercial information 128. The verification of the commercial information 128 may be based at least on verified prices for goods, services, or both. The verification may be based at least on the user identifier. In some instances, the host 102 may retrieve a user profile based on the user identifier, and determine therefrom a likelihood that the commercial information 128 is accurate, e.g., the more often the user 106 has previously provided verified prices for goods, services, or both, the greater the likelihood that the commercial information 128 is accurate. In some instances, the host 102 may retrieve a user profile based on the user identifier. The user profile may include a history of previous submissions of prices for goods, services, or both. The host 102 may determine that the user 106 has submitted at least a threshold number of verified prices for goods, services, or both, and in that case, the host 102 may verify the commercial information 128 based at least on the history of the user 106. In some instances, the host 102 may verify the commercial information 128 based at least on a reputation of the user 106.

In some instances, the host 102 may verify the commercial information 128 based at least on a geographical location of the client-device 106 at a time contemporaneous to when the purchase price 118 and identifier 120 for the goods 114, the services 116, or both were acquired, and/or information indicative of a time contemporaneous to when the client-device 106 transmitted the commercial information 128. The host 102 may determine that the geographical location of the client-device 106 based at least on global positioning system (GPS) data, antenna triangulation, or other location information. The host 102 may weigh the geographical location of the client-device 106 in verifying the commercial information 128. For example, the host 102 may determine that the client-device 106 is at the merchant facility 110A, or within a geographical region 132 encompassing the merchant facility 110A, and determine that the commercial information 128 has a greater likelihood of being accurate than if the client-device 106 were not at the merchant facility 110A, or not within the geographical region 132. Typically, the geographical region 132 is relatively small, e.g., a couple of square blocks in size and/or several square miles in size.

In some instances, the host 102 may create the reward 130 after verification of the commercial information 128. The reward 130 may be based at least on the commercial information 128 and/or other data such as verified prices for goods, services, or both.

In some instances, the reward 130 may include an offer for the sale of goods, services, or both provided by the host and/or may include a purported price for goods, services, or both provided by another merchant, such as merchant 108B and/or 108C. In such instances, the reward 130 may include geographical information indicative of a geographical location of the merchant facility 110B and/or 110C, located in geographical regions 134 and 136, respectively. The geographical information may include an address for one or both of the merchant facilities 110B and 110C. The geographical information may include a map that shows therein the location(s) of the merchant facilities 110B and 110C and/or may include a hyperlink to such map. The purported price for goods, services, or both provided by the merchants 108B and/or 108C may be for the same, or comparable, goods, services, or both as those being provided by the merchant 108A. In such instances, the user 104 may go one or both of the merchant facilities 108B and/or 108C to purchase the goods, the services, or both purportedly being offered by the merchants 108B and/or 108C.

In some instances, the user 104 may use the client-device 106 and/or another computing system 138 to send, to the host 102, a reply message 140 that may constitute an acceptance of an offer from the host 102.

In some instances, the reward 130 may be time limited and may have an expiration time of, for example, several minutes, e.g., 3 minutes, 5 minutes, 10 minutes, or up to an hour. In such instances, the user 104 may need to reply to the reward 130, e.g., accept an offer for goods, services, or both provided by the host 102, while, or concurrent to, the client-device 106 being at the merchant facility 110A and/or within the geographical region 132.

In some instances, the reward 130 may be time limited and may have an expiration time of, for example, several hours, days, or longer, and in such instances, the user 104 may not need to respond to the reward 130, e.g., accept an offer for goods, services, or both provided by the host 102, while, or concurrent to, the client-device 106 being at the merchant facility 110A and/or within the geographical region 132. Rather, the user 104 may have sufficient time to travel to the computing device 138 and use the computing device 138 to send the reply 140 to the host 102.

Figure 2:
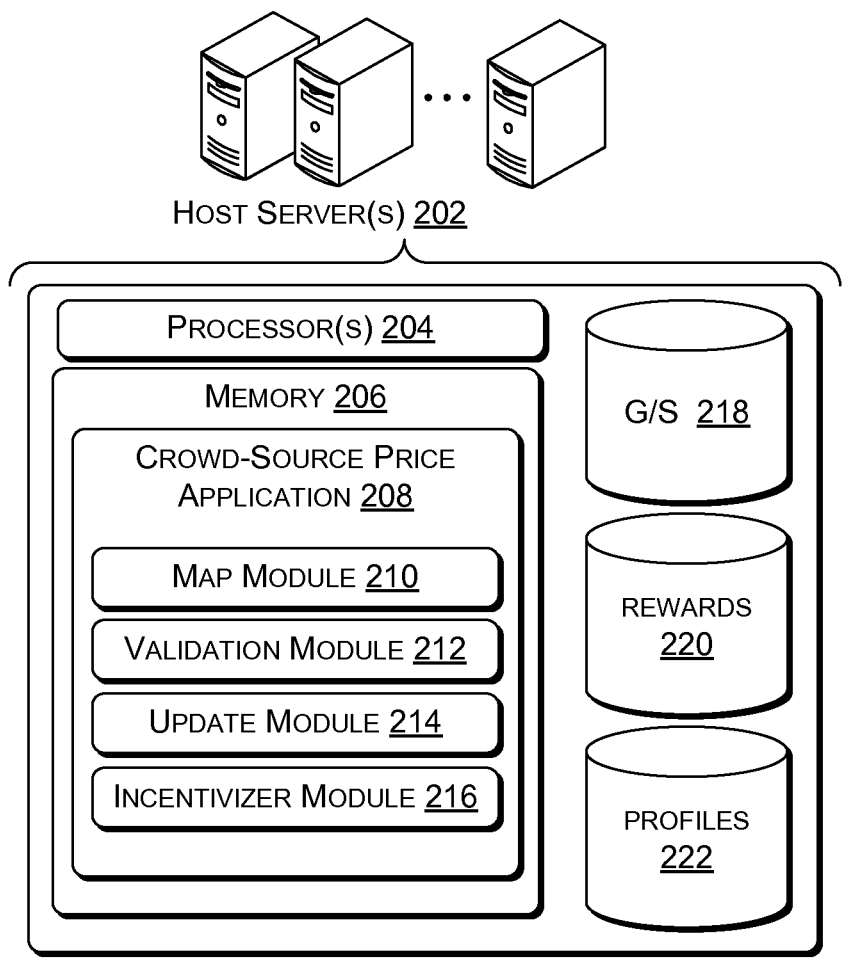
FIG. 2 is a block diagram of an illustrative computing environment for a host that provides a crowd-sourced price program.

Referring to FIG. 2, the host 102 may include host servers 202 that include processors(s) 204 and memory 206. The memory 206 may store various modules, applications, programs, or other data. The memory 206 may include instructions that, when executed by the processor(s) 204, cause the processors to perform the operations described herein for the host 102. In some embodiments, the memory 206 may store a crowd-source price application 208. The crowd-source price application 208 may include a number of modules that perform some or all of the various operations described herein. In accordance with various embodiments, the crowd-source price application 208 may include some or all of the following modules: a map module 210, a validation module 212, an update module 214, and/or an incentivizer module 216. In addition, the host servers 202 may include data storage for commercial information 128 such as goods, services, or both (G/S) data 218, reward data 220, and profiles 222. The G/S data 218 may include verified prices for goods, services, or both for other merchants 108 and corresponding identifiers. The G/S data 218 may also include prices for goods, services, or both provided by the host 102 and corresponding identifiers. In some instances, initial data in the G/S data 218 may be based on sources that the host 102 trusts. For example, the initial data may be based on agents of the host 102, such as agents, acquiring the inquiring the initial data at the merchant locations 110. As another example, initial data may be based on information gathered from the electronic marketplaces 122 of the merchants 108 and/or publications by the merchants 108. As yet another example, some participants of the crowd-sourced price program may be trusted by the host 104 to submit initial information, such as participants with a good reputation, e.g., participants who have previously submitted at least one price 118 and at least one identifier 120 to the host 102 and/or participants having a requite amount of trustworthiness. As described herein, the host 102 may update the data in the G/S data 218 based at least on the commercial information 128 provided by user 104 and/or other participants of the crowd-sourced price program.

The reward data 220 may include rewards 140 provided to participants of the crowd-source pricing program such as, but not limited to, terms of an offer provided to a participant of the crowd-source pricing program.

The profiles data 222 may include user-profiles for participants of the crowd-source pricing program. A user-profile may include historical information for the corresponding user such as, but not limited to, information indicative of goods, services, or both for which the user has previously submitted commercial information 128, information indicative of a number of times the user has previously submitted commercial information 128, information indicative of a reputation or trustworthiness of the user. For example, the user's trustworthiness may be a measure, normalized, of the number times the user has previously submitted commercial information 128 that was subsequently verified to be accurate, e.g., a trustworthiness score of 0.9 may indicate that ninety percent of the user's previously submitted commercial information 128 were subsequently verified as being accurate. A user-profile may also include information indicative of a user-group. In some instances, participants that belong to the same user-group may share rewards with other group members.

Although the application and modules are shown under the host servers 202 in FIG. 2, the application and/or modules may be distributed across various servers and/or locations in some embodiments, such as being implemented in a cloud computing system. Each of the various modules is described in turn.

The map module 210 may provide location information of various merchant facilities 110. For example, the map module 210 may plot a location of the merchant facility 110A and 110B on a map. The map module 210 may also plot a location of the user 104 based on a location of the client-device 106 (via global positioning system (GPS) data, antenna triangulation, or other location information). In some instances, the map module 210 may determine whether the client-device 106 is within a specified distance of a particular merchant facility 110 and/or within a geographical region 132 encompassing the particular merchant facility.

The validation module 212 may receive the commercial information 128 and process the received commercial information 128 to determine a purported purchase price for goods, services, or both provided by a particular one of the merchants 108 and to determine an identifier corresponding to the goods, the services, or both provided by the particular merchant at the purported price. The validation module 212 may employ optical character recognition (OCR) to read information contained in one of more images such as the purchase price 118, the identifier 120, merchant identifier, merchant location, etc. Similarly, the validation module 212 may employ speech recognition to convert utterances related to commercial information 128 of the particular merchant into text. For example, the user 104 may have spoken the purchase price 118, the identifier 120, merchant identifier, merchant location, etc. into the client-device 106, and the commercial information 128 may include the information spoken by the user 104 in an audio format, which is converted into text by the host 102.

In addition, the validation module 212 may validate commercial information 128 such as purported purchase prices for goods, services, or both provided by merchants 108. The validation module 212 may validate received commercial information 128 based at least on one or more factors including, a participant's history of submissions of commercial information 128, a location of the client-device 106, previously validated purchase prices for goods, services, or both provided by merchants 108, the particular merchant 108 associated with the received commercial information 128, advertised prices for goods, services, or both. In some instances, the validation module 212 may validate received commercial information 128 based at least on a user profile. For example, the validation module 212 may give greater weight to commercial information 128 provided by the user 104 than validation module 212 may give to another participant based on the user 104 having a reputation (or trustworthiness) for providing accurate data.

In some instances, the validation module 212 may validate a purported price in the commercial information 128 based on a comparison of a validated price in the in the G/S data 218. The validation module 212 may retrieve the validated price from the G/S data 218 based on the identifier 120. The validation module 212 may determine that the purported price in the commercial information 128 is valid if a relative price difference or a percentage price difference between the purported price and the validated price is below a threshold amount. For example, if the purported price is $500, the validated price from the G/S data 218 is $1000, the threshold for validity is 0.25, then the validation module 212 will calculate a relative difference (RD=absolute value(validated price−purported price)/validated price) of 0.5, and consequently, the validation module 212 may determine the purported price invalid. In some instances, the validation module 212 may include the relative price difference or the percentage price difference as one factor, among multiple factors, in determining whether the purported price is valid.

The update module 214 may retrieve and update profiles from user profiles data 222. The update module 214 may update a profile to reflect among other things, a history of submissions of commercial information 128, an indicator of trustworthiness (or reputation), participation points, group membership, shared rewards, etc.

The update module 214 may also update the G/S data 218 to reflect purchase prices for goods, services, or both validated by the validation module 212. The G/S update module may also retrieve validated prices for goods, services, or both from the G/S data 218 and provide the retrieved validated prices to the validation module 212 and/or the incentivizer module 216.

The incentivizer module 216 may generate and manage rewards 220. In some embodiments, the incentivizer module 216 may determine whether to provide the user 104 with a reward 130 that includes an offer for goods, services, or both provided by the host. In some instances, the goods, the services, or both offered by the host may be the same as the goods, the services, or both offered by the merchant 108. In other instances, the goods, the services, or both offered by the host may be the comparable to the goods, the services, or both offered by the merchant 108. In other instances, the goods, the services, or both offered by the host may be the same or comparable to the goods, the services, or both offered by the merchant 108 and may include additional goods, services, or both that were not offered by the merchant 108.

In some embodiments, the incentivizer module 216 may determine whether to provide the user 104 with a reward 130 that includes services, which may or may not be offered by the merchant 108. For example, the incentivizer module 216 may provide the user 104 with a service in response to the user's notification of prices updates by another merchant.

In some embodiments, the incentivizer module 216 may determine which particular merchant 108 corresponds to the received commercial information 128 and may determine whether to provide the user 104 with a reward 130 that includes purported purchase prices, or previously validated prices, for goods, services, or both provided by a different merchant 108. In some instances, the reward 130 may include geographical information indicative of a geographical location of a merchant facility 110 of the different merchant 108.

Illustrative Interfaces and Operations
Illustrative Mapping

Figure 3:
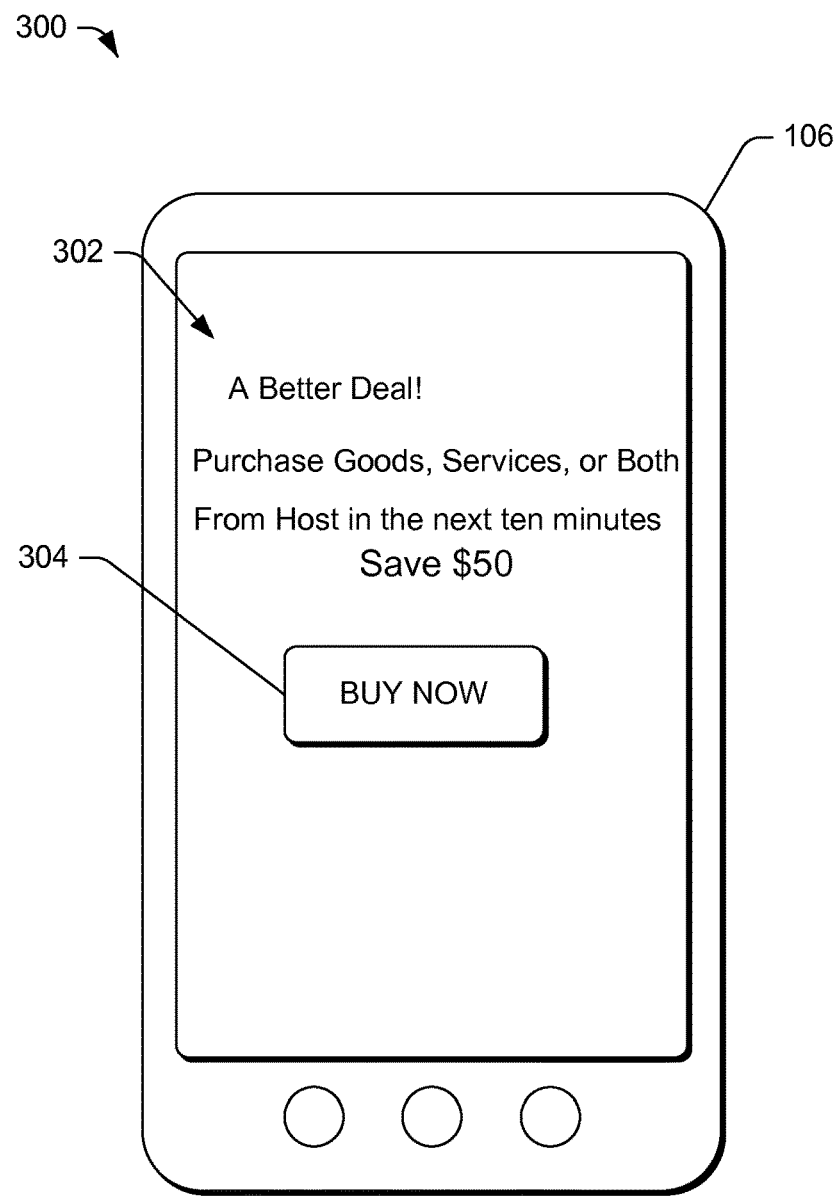
FIG. 3 is an illustrative user interface (UI) that displays a reward.

FIG. 3 is an illustrative UI 300 that displays a reward to the user 104. The UI 300 includes a time limited offer 302 for purchasing goods, services, or both from the host 102. The UI 300 may be displayed, after the user 104 provides the host 102 with the commercial information 128, on the client-device 106 while the user 104 is at the merchant facility 108. The time limited offer 302 may include terms that are more favorable to the user 104 than the terms being offered by the merchant 108. For example, the terms of the time limited offer 302 may include, but are not limited to, a lower purchase price, a warranty and/or extended warranty, financing, redeemable bonus points, free or reduced shipping, schedulable delivery, training, servicing, etc.

The UI 300 includes a buy-now command 304 to enable the user 104 to accept the offer from the host 102. By activating the buy-now command 304, the client-device 106 generates and transmits the reply 140 accepting the offer, from the host 102, for the goods, the services, or both provided by the host 102.

Illustrative Reward

Figure 4:
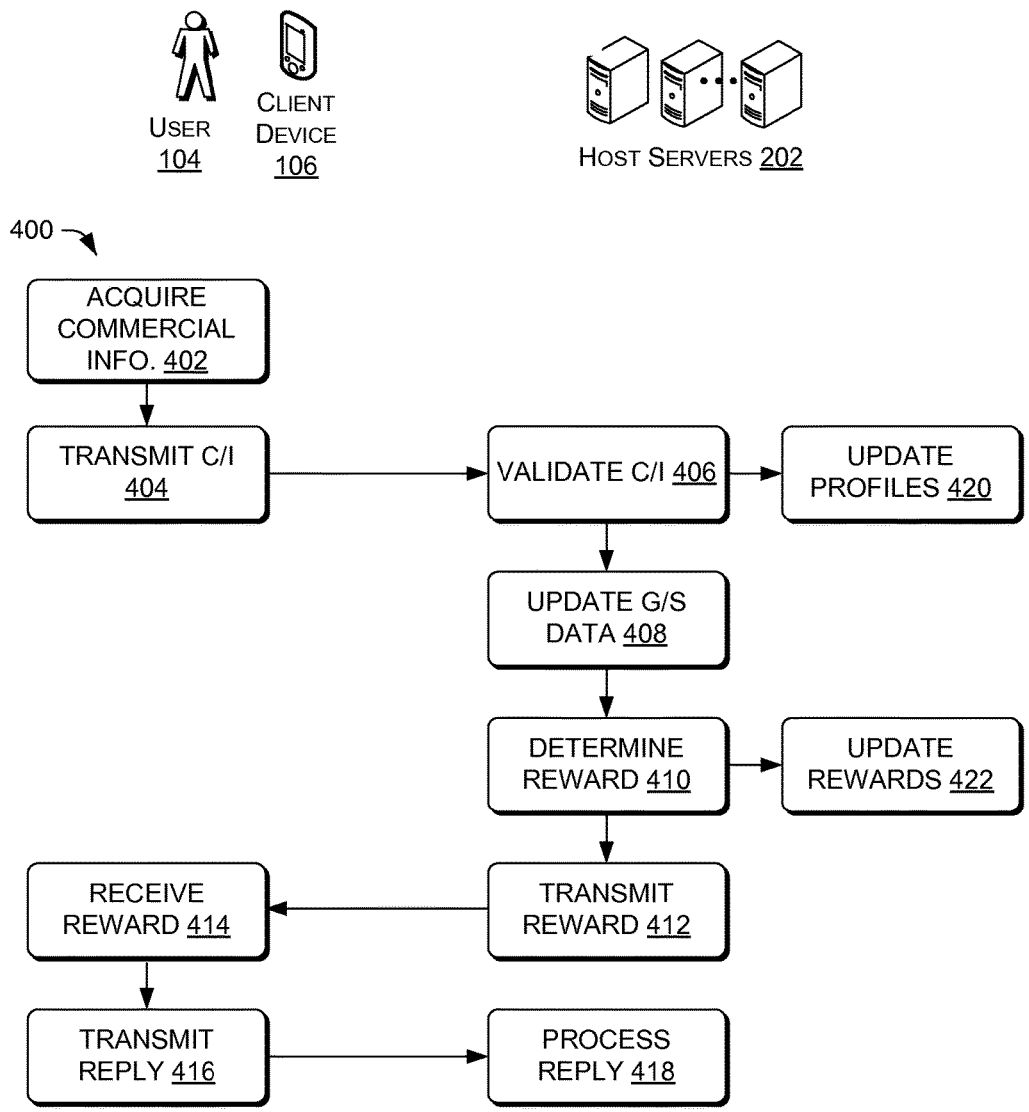
FIG. 4 is a flow diagram of an illustrative process for providing a reward for crowd-source pricing.

FIG. 4 is a flow diagram of an illustrative process 400 for providing a reward for participating in the crowd-sourced price program. The process 400 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 400, shall be interpreted accordingly.

The process 400 is described with reference to the environment 100. Of course, the process 400 (and other processes described herein) may be performed in other similar and/or different environments.

At 402, commercial information for goods 114, services 116 of a merchant (e.g., the merchant 108A) is acquired. The commercial information may include the purchase price 118 and the identifier 120 for the goods 114, the services 116, or both. The commercial information may be acquired by the client-device 106 (e.g., via an image obtained from a camera, etc.) and/or the user 104 may input, via the user interface 126, information corresponding to the commercial information.

At 404, the user 104, via the client-device 106, may transmit the commercial information 128, related to the merchant 108A, to the host 102 via the network(s) 124. The commercial information 128 may include the purchase price 118 for goods 114, services 116, or both provided by the merchant 108A and may also include the identifier 120 corresponding to the goods 114, the services 116, or both. The commercial information 128 may also include information indicative of an identity for the merchant 108A, a geographical location associated with the information, a time/date stamp, and/or other relevant information.

At 406, the host servers 202 may validate the commercial information 128. The host servers 202 may compare a purported purchase price from the commercial information 128 with a validated purchase price from the G/S data 222. The host servers 202 may validate the commercial information 128 based at least on a geographical location of the client-device 106. In some instances, the host servers 202 may determine an identity for the merchant 108A based at least on the geographical location of the client-device 106.

At 408, the host servers 202 may update the G/S data 222 to reflect validated purchase prices.

At 410, the host servers 202 may determine the reward 130 to be provided to the user 104. In some instances, the reward 130 may be an offer for goods, services, or both provided by the host 102. In some instances, the reward 130 may provide the user 104 with information for other merchants, e.g., merchants 108B and/or 108C, providing the same, or comparable, goods, services, or both as those being provided by merchant 108A. The information for other merchants may include geographical location indicators and may include details such as a purported price for the same or comparable goods, services, or both. In some instances, the reward 130 may be a time limited offer having an expiration time for goods, services, or both.

At 412, the host servers 202 may transmit the reward 130 to the client-device 106.

At 414, client-device 106 receives the reward 130. In some instances, the user 104 may receive benefits of the reward 130 without doing anything further. For example, the reward for the user 104 participating in the crowd-sourced price program may be to notify the user 104 of other merchants 108B, 108C providing the same, or comparable, goods, services, or both. The notification may include geographical location indicators and may include details such as a purported price for the same or comparable goods, services, or both. In this case, the user 104 benefits from comparative price shopping without needing to respond to the reward.

As another non-limiting example, the reward for the user 104 participating in the crowd-sourced price program may be to monitor the purchase price 118 for the goods 114, the services 116, or both provided by the merchant 108A and to notify the user 104 when the merchant 108A and/or other merchants 108B, 108C offer the same goods, services, or both at a lower price. In this case, if the user 104 purchases, at the purchase price 118, the goods 114, the services 116, or both from merchant 108A and merchant 108A provides a guaranteed-lowest price program, then the user 104 may be eligible for a refund upon being notified of the goods 114, the services 116, or both being offered at a lower price.

However, in some instances, the user 104 may need to respond to the host 102 in order to receive benefits of the reward 130. For example, the reward 130 may include an offer for goods, services or both provided by the host 102.

At 416, the client-device 106 transmits the reply 140 to the host servers 202. The reply 140 may include acceptance by the user 104 of an offer for goods, services, or both provided by the host 102.

At 418, the host servers 202 process the reply 140. Processing the reply 140 may include determining that the user 104 has met all terms of the reward 140. Processing the reply 140 may include determining whether the user 104 transmitted the reply 140 before an expiration time for an offer by the host 102. Processing the reply 140 may include determining whether the reply 140 was received at the host servers 202 before an expiration time for an offer by the host 102. Processing the reply 140 may include determining whether the client-device 106 is at the merchant facility 110A, or within a geographical region 132 encompassing the merchant facility 110A. If the user 104 has not met the terms of the reward 140, the host servers 202 may reject providing the user 104 with the benefits of the reward 138.

At 420, the host servers 202 may update the profiles data 222 based at least on the reply 140. Among other things, the host servers 202 may update the profile of user 104 to reflect that user 104 accepted the reward. The host servers 202 may determine future rewards based at least on rewards that the user 104 has previously accepted.

At 422, the host servers 202 may update the rewards data 220 based at least on the reply 140.

Figure 5:
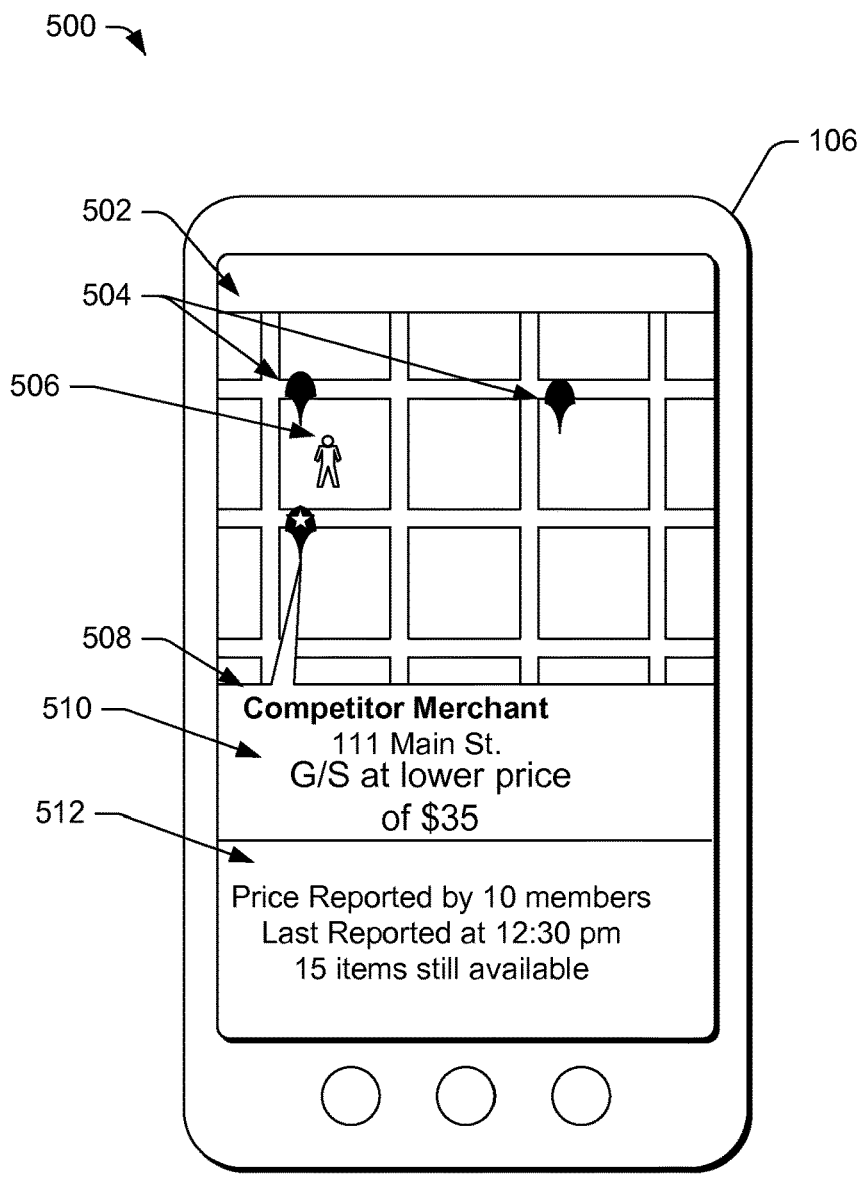
FIG. 5 is an illustrative UI that maps merchant facilities in relation to a user's location.

FIG. 5 is an illustrative user interface (UI) 500 that maps merchant facilities in relation to a user's location. The UI 500 may be populated with data from the map module 210 to create a map 502, which may be displayed by the client-device 106. Typically, the UI 500 may be displayed on the client-device 106 shortly after the user 104 provides the host 102 with the commercial information 128 such that the user is typically still at the merchant facility 108.

The map 502 may represent a designated area or location range, such as a predetermined number of blocks, miles, or other area (e.g., community, zip code, etc.). The map 502 may include geographical location indicators 504 on the map that show geographical locations of merchant facilities 110. The map 502 may also show a location 506 of the user 104 via the user device 106.

In some embodiments, the map 502 may provide a merchant name 508 for a competitor merchant offering the same or comparable goods, services, or both. The map 502 may also include pricing information 510 indicating the price of the goods, the services, or both being provided by the competitor merchant. Thus, the user 104 can price shop among the merchants 108 without having to leave the merchant facility 108.

In some embodiments, the map 502 may include G/S confirmation information 512. The G/S confirmation information 512 may include information by which the user 104 may be able to confirm aspects of the pricing information 510. For example, the G/S confirmation information 512 may include information that the goods, services, or both being offered by the competitor merchant are likely to be available, such information may indicate a number of items that the competitor merchant has available and/or a number of items that at least one other participant of the crowd-sourced price program reported to the host 102 as being available. In some instances, the G/S confirmation information 512 may include information that indicates a number of other participants of the crowd-sourced price program that reported a price to the host 102 and may include an indicator of a time when at least one other participant of the crowd-sourced price program reported the price to the host 102.

Figure 6:
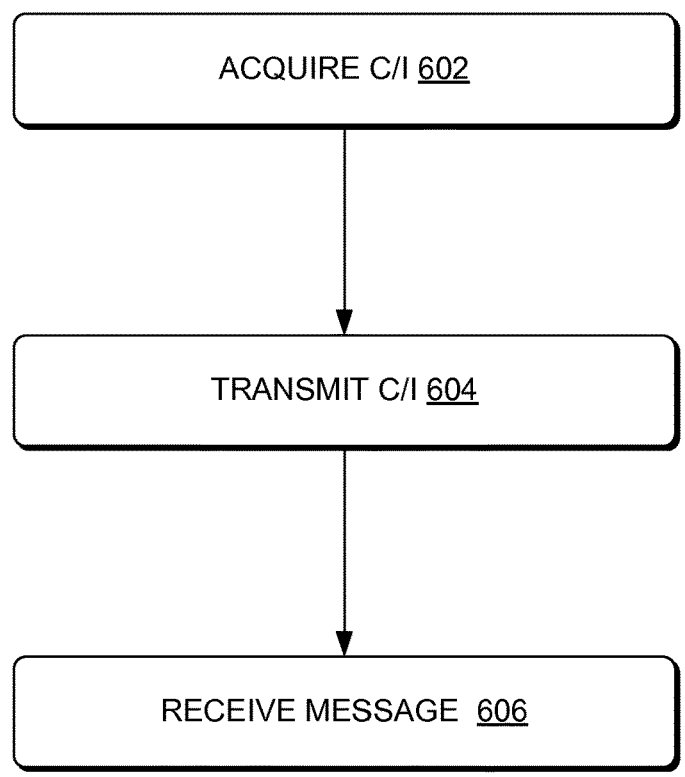
FIG. 6 is a flow diagram of an illustrative process for providing a user with a reward for participating in the crowd-source price program.

FIG. 6 is a flow diagram of an illustrative process 600 for providing a user with a reward for participating in the crowd-source price program. The order in which the operations are described is not intended to be construed as a limitation, and any number of the described blocks can be combined in any order and/or in parallel to implement the process. The process 600 is described with reference to the environment 100 and may be performed by the client-device 106. Of course, the process 600 may be performed in other similar and/or different environments.

At 602, the client-device 106 may acquire commercial information 128 comprising a purchase price 118 for goods 114, services 116, or both provided by merchant 108A and an identifier 120 for the goods 114, the services 116 or both. The commercial information 128 is typically acquired contemporaneous to the client-device 106 being within the geographical region 132 encompassing the merchant facility 110A. The user 104 may use the client-device 106 to acquire the commercial information 128 by capturing an image, scanning, and/or reading the purchase price 118 and the identifier 120 for the goods 114, the services 116, or both. In some instances, the user 104 may input, via the user interface 126, the purchase price 118 and the identifier 120 for the goods 114, the services 116, or both.

At 604, the client-device 106 may transmit the commercial information 128 comprising the purchase price 118 and the identifier 120 to the host 102. Typically, the commercial information 128 is transmitted contemporaneous to the client-device 106 being within the geographical region 132 encompassing the merchant facility 110A.

At 606, the client-device 106 receives a message such as the reward 130 from the host 102. The message may include a time-limited offer 302 for sale of goods, services, or both provided by the host 102 and/or may include pricing information 510 for goods, services, or both provided by another merchant 108B, 108C. Typically, the message from the host is transmitted contemporaneous to the client-device 106 being within the geographical region 132 encompassing the merchant facility 110A.

Figure 7:
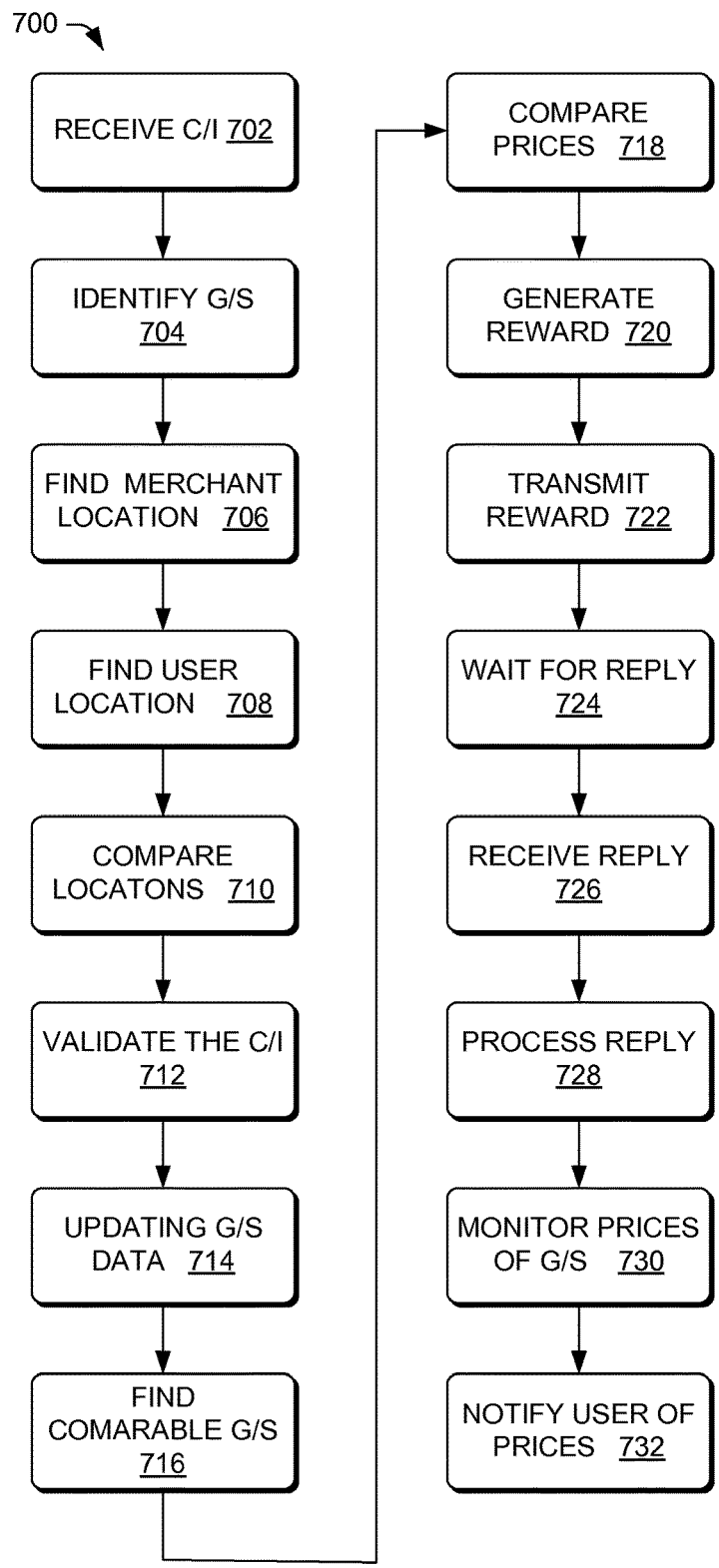
FIG. 7 is a flow diagram of another illustrative process for providing a user with a reward for participating in the crowd-source price program.

FIG. 7 is a flow diagram of an illustrative process 700 for providing a user with a reward for participating in the crowd-source price program. The order in which the operations are described is not intended to be construed as a limitation, and any number of the described blocks can be combined in any order and/or in parallel to implement the process. The process 700 is described with reference to the environment 100 and may be performed by the host 102 via the host servers 202. Of course, the process 700 may be performed in other similar and/or different environments.

At 702, commercial information 128, from the client-device 106, is received at the host 102. The commercial information 128 may include a purchase price 118 for goods 114, services 116, or both provided by merchant 108A and an identifier 120 for the goods 114, the services 116 or both. In some instances, the commercial information 128 may also include information related to the client-device 106 and/or the user 104. For example, information indicative of the current geographical location of the client-device 106 may be included with the commercial information 128, and information indicative of an identity of the user 104 may be included with the commercial information 128. Other non-limiting examples of information that may be included with the commercial information include a time-stamp indicative of when the client-device 106 acquired the purchase price 118 and identifier 120, a time-stamp indicative of when the commercial information 128 was transmitted, a merchant-identifier that identifies a particular one of the merchants 108.

At 704, the host 102 may identify specific goods, specific services, or both, which may be provided by the host 102, based at least on the identifier 120 for the goods 114, the services 116 or both. In some instances, the commercial information 128 may embody in one or more digital images of the purchase price 118 and the identifier 120. The host 102 may apply optical character recognition technology to the digital image(s) to read/determine the purchase price 118 and/or the identifier 120. With the identifier 120, the host 102 may determine which goods 114, or which services 116, or both are being offered at the purchase price 122 by the merchant 108. For example, the host 102 may determine that the merchant 108 is offering a brand and model of a television at the purchase price 122 based on the identifier 120.

At 706, the host 102 may determine a location for the merchant facility 110A and/or a geographical identifier associated with the location of the merchant facility 110A. In some instances, the geographical identifier is a postal code such a full or partial address, a zip code, a name of a state, an abbreviation of a name of a state, a country name, an abbreviation of a country name, etc. In some instances, the geographical identifier may be a regional designation such as, for example, the west coast of the United States, the west coast of the United States, the east coast of the United States, eastern United States, western United States, southern United States, northeast United States, etc. In some instances, the host 102 may find other merchants, such as merchants 108B, 108C, having merchant facilities, such as merchant facilities 110B, 110C, based at least on the geographical identifier.

At 708, the host 102 may determine a geographical location of the client-device 106. The location of the client-device 106 may be determined based at least on global positioning system (GPS) data, antenna triangulation, or other location information.

In some instances, the host 102 may determine the location of the merchant facility 110 and/or the client-device 106 based at least on information carried in the commercial information 128. For example, in some instances, the user 104 may, via the user interface 126, provide the client-device 106 with an address of the merchant facility 110.

At 710, the host 102 may compare the locations of the merchant facility 110A and the client-device 106. In some instances, the reward provided by the host 102 may depend on the client-device 106 being within the geographical region 132.

At 712, the host 102 may validate the received commercial information 128. Typically, the host 102 validates the commercial information 128 while the client-device 106 is within the geographical region 132 encompassing the merchant facility 110A. The host 102 may validate the commercial information 128 based at least in part on the locations of the client-device 106 and the merchant facility 110A being the same or the client-device 106 being within the geographical region 132 or the client-device 106 being with a predetermined range of the merchant facility 110A. The host 102 may validate the commercial information 128 based at least in part on price comparisons such as comparing the commercial information 128 based at least on a comparison to a validated price from the G/S data 218. The host 102 may validate the commercial information 128 based at least in part on price comparisons such as comparing the commercial information 128 based at least on a comparison to of prices for other merchants. The comparison to other merchants may be geographically limited such as to those merchants within geographical region 132 and/or geographical region 136. The comparison to other merchants may be geographically limited such as to those merchants having a common postal code.

At 714, the host 102 may update a validated price for the specific goods, specific services, or both based at least on the purchase price 118.

At 716, the host 102 may find goods, services, or both that are related to, or comparable to, the goods 112, the services 114, or both. The host 102 may determine goods are comparable based at least on specifications of the goods. The host 102 may determine that services are comparable based at least on terms for providing the services. In some instances, may determine goods are comparable based at least on content, e.g., the goods 112 may be for content embodied in a first media format such as, but not limited to, paper, digital video disk (DVD), and/or compact disk (CD), and the host 102 may determine that goods having the same content, but embodied in a second media format that is different from the first media format, are comparable. For example, the host 102 may determine that paper book and a digital book having the same content are comparable goods.

At 718, the host 102 may compare the purchase price 118 with prices from the G/S data 218, for goods, services, or both that are the same as, comparable to, and/or related to the goods 112, the services 114, or both. In some embodiments, the host 102 may compare the purchase price 118 with prices from the G/S data 218, for goods, services, or both that are the same as the goods 112, the services 114, or both prior to validation of the purchase price 118.

At 720, the host 102 may generate a reward for the user 104. The reward may be, among other things, an offer from the host 102 for the goods 114, the services 116, or both at terms that are more favorable to the user 104 than terms being offered by the merchant 108A such as, but not limited to, financing, delivery, at a price lower than the purchase price 118, etc. The reward may be, among other things, notification of other merchants 108B, 108C that provide the same goods 114, the services 116, or both at terms more favorable to the user 104 than terms being offered by the merchant 108A.

In some instances, the reward may be based at least on the comparison of the purchase price 118 with prices from the G/S data 218. In some instances, the host 102 may generate the reward based on at least on providing a price that is lower than the purchase price 118. However, in other instances, the host 102 may determine not to provide a price that is lower than the purchase price 118 and may generate a reward based on other criteria.

At 722, the host 102 may transmit the reward to the client-device 106.

At 724, the host 102 may wait for a reply 140 from the user 104. In some instances, the host 102 may initiate a timer if the reward has an expiration time, and in such instances, the reward is only valid if the reply 140 from the user is received at the host 102 before the timer expires. In other instances, the host 102 may determine whether a time-limited reward is valid based on a time at which the reply 140 is transmitted and/or based on a time at which the host 102 receives the reply. In yet other instances, the reward may not be time limited, and in such instances, the user 104 is not required to send a reply within a given time window. In yet other instances, the user 104 is not required to send a reply to the host 104 in order to gain the benefits of the reward.

At 726, the host 102 may receive the reply 140 from the user 104. In some instances, the reply 38 may be transmitted from the client-device 106 or from the computing device 138.

At 728, the host 102 may process the reply. In some instances, the host 102 may complete a transaction for goods, services, or both offered in the reward. In other instances, the reply may include a request for a notification service provided by the host 102.

At 730, the host 102 may monitor prices of goods, services, or both that correspond to the received commercial information 128.

At 732, the host 102 may notify the user 104 of current prices of goods, services, or both that correspond to the received commercial information 128.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method of distributing a physical-location contingent offer over a network to a mobile device associated with a client, the method comprising:
   providing an instance of a crowd-source price application to the client for installation on the mobile device;
   receiving, from the mobile device via the crowd-source price application, a first price for an item offered by a first merchant and an identifier for the item;
   validating the first price based at least on commercial information received from at least one other mobile device of another client via another instance of the crowd-source price application installed on the at least one other mobile device, wherein the commercial information includes at least an additional price corresponding to the identifier for the item;
   determining, based on first location data corresponding to the mobile device, a first location of the mobile device;
   determining, based at least in part on the first location, that the mobile device is currently no more than a predetermined distance from a physical facility of the first merchant;
   transmitting, contemporaneously to the mobile device being no more than the predetermined distance from the physical facility, a message comprising the physical-location contingent offer for the item from a second merchant that is at a second price that is lower than the first price, and wherein the item comprises at least one of a physical good, a digital good, an article for sale, or a service;
   receiving, from the mobile device, a reply message including an acceptance of the physical-location contingent offer for the item;
   determining, based on second location data corresponding to the mobile device, a second location of the mobile device corresponding to a time of the client sending the reply message;
   determining whether the second location is more than the predetermined distance from the physical facility; and
   based at least in part on determining that the second location is more than the predetermined distance from the physical facility, denying the client of any benefits of the physical-location contingent offer.

2. The method as recited in claim 1, wherein the physical-location contingent offer further includes an offer for a substitute for the item offered by the first merchant.

3. The method as recited in claim 1, wherein the message further comprises a promotion for the item offered by the second merchant.

4. The method as recited in claim 3, wherein the promotion expires based at least in part on a time of the receiving the first price or the identifier via the mobile device.

5. The method as recited in claim 1, wherein the message includes the second price for the item offered by the second merchant and a location of the second merchant.

6. The method as recited in claim 1, wherein the second merchant is selected based on a proximity of the second merchant to the physical facility.

7. A method comprising:
receiving, from a price-application installed on a mobile device associated with a user, a first price for an item offered by a first merchant, an identifier for the item, and first location data indicating that the mobile device is currently no more than a predetermined distance from a physical facility of the first merchant;
validating the first price based at least on commercial information received from at least one other mobile device via another instance of the price-application installed on the at least one other mobile device, wherein the commercial information includes at least an additional price corresponding to the identifier for the item;
identifying a second merchant that offers the item;
generating a message that comprises an offer contingent on a physical location of the mobile device being no more than the predetermined distance from the physical facility of the first merchant at a time of transmitting a message accepting the offer, wherein the offer is for the item from the second merchant at a second price that is lower than the first price;
transmitting the message to the price-application installed on the mobile device in response to receiving, from the mobile device, the first price, the identifier for the item, and the first location data;
receiving, from the mobile device, a reply message including an acceptance by the user of the offer;
determining, based on second location data corresponding to the mobile device, a second location of the mobile device corresponding to a time of the mobile device sending the reply message;
determining whether the second location is more than the predetermined distance from the physical facility of the first merchant; and
based at least in part on determining that the second location is more than the predetermined distance from the physical facility of the first merchant, denying the user of any benefits of the offer.

8. The method as recited in claim 7, wherein the item comprises at least one of a physical good, a digital good, or a service.

9. The method as recited in claim 7, wherein identifying the second merchant includes identifying the second merchant as a merchant that is physically located within a threshold distance from the mobile device or the first merchant.

10. The method as recited in claim 7, wherein the item offered by the second merchant is a substitute item for the item offered by the first merchant.

11. The method as recited in claim 7, wherein the message further comprises a promotion for the item offered by the second merchant.

12. The method as recited in claim 11, wherein the promotion includes an expiration based at least in part on a time of the receiving the price and the identifier for the item.

13. The method as recited in claim 7, wherein the first merchant and the second merchant include physical locations that offer the item for sale.

14. A system comprising:
one or more processors; and
one or more memories storing one or more computer-executable instructions that are executable by the one or more processors to:
receive, from a crowd-source price application installed on a mobile device associated with a user to enable participation in a crowd-source price program, an identifier for an item offered by a first merchant and a first price for the item;
validating the first price based at least on commercial information received from at least one other mobile device, associated with another user, via another instance of the price-application installed on the at least one other mobile device, wherein the commercial information includes at least an additional price corresponding to the identifier for the item;
identify a second merchant that offers the item for a second price that is less than or equal to the first price;
generate a message that comprises an offer to sell the item for the second price from the second merchant and a reward including at least participation points for providing the first price via the crowd-source price application, wherein the participation points are redeemable towards purchases and transferrable to other participants of the crowd-source price program;
transmit the message to the mobile device in response to the receiving of the identifier and the first price for the item from the mobile device;
receive, from the mobile device, a reply message including an acceptance of the offer and location data corresponding to the location of the mobile device at the time the mobile device sends the reply message;
determining that the location is more than a predetermined distance from a physical facility of the first merchant; and
based at least in part on determining that the location is more than the predetermined distance from the physical facility, denying the user any benefits of the offer.

15. The system recited in claim 14, wherein identification of the second merchant includes identifying the second merchant as being physically located within a threshold distance from the physical location of the at least one of the mobile device or the first merchant.

16. The system recited in claim 14, wherein the message further comprises a promotion for the item offered by the second merchant.

17. The system recited in claim 16, wherein the promotion includes an expiration based at least in part on a time of a receipt of the identifier or the price of the item.

18. The system recited in claim 16, wherein the promotion reduces the second price of the item offered by the second merchant to an amount less than the first price of the item offered by the first merchant.

19. The system recited in claim 14, wherein the message includes the second price for the item offered by the second merchant and a location of the second merchant.

20. The system recited in claim 14, wherein the item offered by the second merchant comprises at least one of a physical good, a digital good, or a service.

* * * * *